(12) United States Patent
Krishnan et al.

(10) Patent No.: US 9,253,287 B2
(45) Date of Patent: Feb. 2, 2016

(54) SPECULATION BASED APPROACH FOR RELIABLE MESSAGE COMMUNICATIONS

(75) Inventors: Venkata S. Krishnan, Ashland, MA (US); Mark Hummel, Franklin, MA (US); David E. Mayhew, Northborough, MA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 351 days.

(21) Appl. No.: 13/589,463

(22) Filed: Aug. 20, 2012

(65) Prior Publication Data

US 2014/0052808 A1 Feb. 20, 2014

(51) Int. Cl.
*G06F 15/16* (2006.01)
*H04L 29/06* (2006.01)

(52) U.S. Cl.
CPC .................................... *H04L 67/40* (2013.01)

(58) Field of Classification Search
CPC ..... H04L 69/32; H04L 69/326; H04L 69/163; H04L 69/165; H04L 69/321; G06F 13/28
USPC .......................................... 709/204, 212, 217
See application file for complete search history.

(56) References Cited

U.S. PATENT DOCUMENTS

| | | | |
|---|---|---|---|
| 5,790,541 A | 8/1998 | Patrick et al. | |
| 6,785,892 B1 | 8/2004 | Miller et al. | |
| 6,795,886 B1 | 9/2004 | Nguyen | |
| 6,823,453 B1 | 11/2004 | Hagerman | |
| 6,850,987 B1 | 2/2005 | McCanne et al. | |
| 7,421,532 B2 | 9/2008 | Stewart et al. | |
| 7,480,303 B1 | 1/2009 | Ngai | |
| 7,502,840 B1 | 3/2009 | Bakke | |
| 7,814,259 B2 | 10/2010 | Stewart et al. | |
| 7,913,019 B2 | 3/2011 | Inagawa et al. | |
| 7,913,027 B2 | 3/2011 | Kloeppner et al. | |
| 2002/0069318 A1 | 6/2002 | Chow et al. | |
| 2002/0087751 A1 | 7/2002 | Chong | |
| 2003/0123468 A1 | 7/2003 | Nong | |
| 2004/0258062 A1 | 12/2004 | Narvaez | |

(Continued)

FOREIGN PATENT DOCUMENTS

EP 0581486 2/1994

OTHER PUBLICATIONS

Non-Final Office Action in related U.S. Appl. No. 13/675,401, mailed on Jan. 2, 2014; 20 pages.

(Continued)

*Primary Examiner* — Joseph E Avellino
*Assistant Examiner* — Marshall McLeod
(74) *Attorney, Agent, or Firm* — Park, Vaughan, Fleming & Dowler LLP

(57) ABSTRACT

Described are a system and method for lossless message delivery between two processing devices. Each device includes a remote direct memory access (RDMA) messaging interface. The RDMA messaging interface at the first device generates one or more messages that are processed by the RDMA messaging interface of the second device. The RDMA messaging interface of the first device outputs a notification to the second device that a message of the one or more messages is available at the first device. A determination is made that the second device has resources to accommodate the message. The second device performs an operation in response to determining that the processing device has the resources to accommodate the message.

41 Claims, 8 Drawing Sheets

(56) References Cited

U.S. PATENT DOCUMENTS

| | | | |
|---|---|---|---|
| 2005/0117578 | A1 | 6/2005 | Stewart et al. |
| 2006/0242330 | A1* | 10/2006 | Torudbakken et al. ............ 710/5 |
| 2006/0282547 | A1 | 12/2006 | Hasha et al. |
| 2007/0162572 | A1 | 7/2007 | Aloni et al. |
| 2007/0283128 | A1 | 12/2007 | Hoshaku |
| 2008/0005624 | A1 | 1/2008 | Kakivaya et al. |
| 2008/0028467 | A1 | 1/2008 | Kommareddy et al. |
| 2009/0070405 | A1 | 3/2009 | Mazzaferri |
| 2009/0175276 | A1 | 7/2009 | Tsuge et al. |
| 2009/0292813 | A1 | 11/2009 | Snively et al. |
| 2009/0323710 | A1 | 12/2009 | Shahar et al. |
| 2010/0142560 | A1 | 6/2010 | Sharivker et al. |
| 2010/0172172 | A1 | 7/2010 | Kim et al. |
| 2010/0241722 | A1 | 9/2010 | Seminaro et al. |
| 2010/0250717 | A1 | 9/2010 | Akagi |
| 2010/0272117 | A1 | 10/2010 | Wu et al. |
| 2011/0072204 | A1 | 3/2011 | Chang et al. |
| 2011/0103245 | A1 | 5/2011 | Lu |
| 2011/0106905 | A1* | 5/2011 | Frey et al. ..................... 709/212 |
| 2011/0202701 | A1 | 8/2011 | Maitra |
| 2012/0033672 | A1 | 2/2012 | Page et al. |
| 2012/0243542 | A1 | 9/2012 | Sugumar et al. |
| 2012/0284712 | A1 | 11/2012 | Nimmagadda et al. |
| 2012/0291028 | A1 | 11/2012 | Kidambi et al. |
| 2012/0331065 | A1* | 12/2012 | Aho et al. ..................... 709/206 |
| 2013/0258899 | A1 | 10/2013 | Anantharam et al. |

OTHER PUBLICATIONS

International Search Report & Written Opinion for related international patent application No. PCT/US13/69572, mailed on Feb. 20, 2014; 14 pages.

Non-Final Office Action in related U.S. Appl. No. 13/602,512, mailed on Mar. 11, 2014; 18 pages.

Non-Final Office Action in related U.S. Appl. No. 13/526,973, mailed on Mar. 17, 2014; 8 pages.

Mayhew et al., "PCI Express and Advanced Switching: Evolutionary Path to Building Next Generation Interconnects", Proceedings from 11th Symposium on High Performance Interconnects, Aug. 20, 2003, pp. 21-29.

Tanenbaum A S Ed, "Chapter 4", Computer Networks, Jan. 1, 1996, Prentice-Hall International, London, pp. 310-317.

Non-Final Office Action in related U.S. Appl. No. 13/529,452, mailed on Dec. 17, 2014; 20 pages.

International Search Report and Written Opinion in Related International Patent Application No. PCT/US13/40508, mailed Jul. 29, 2013; 14 pages.

Non-Final Office Action in related U.S. Appl. No. 13/470,847, mailed on Sep. 6, 2013; 22 pages.

International Search Report & Written Opinion in related international patent application No. PCT/US13/44278, mailed on Sep. 19, 2013; 11 pages.

Loi, et al, "A Low-overhead Fault Tolerance Scheme for TSV-based 3D Network on Chip Links", IEEE International Conference on Computer-Aided Design, Nov. 10, 2008, New Jersey, USA; 5 pages.

International Search Report & Written Opinion in related international patent application No. PCT/US13/44902, mailed on Oct. 14, 2013; 11 pages.

Non-Final Office Action in related U.S. Appl. No. 13/529,452, mailed on Dec. 17, 2013; 20 pages.

Mayhew et al.; Patent Application for "Devices and Methods for Interconnecting Server Nodes", U.S. Appl. No. 13/526,973, filed Jun. 19, 2012.

David E. Mayhew; Patent Application for "Memory Switch for Interconnecting Server Nodes", U.S. Appl. No. 13/529,452, filed Jun. 21, 2012.

Hummel et al.; Patent Application for "Server Node Interconnect Devices and Methods"; U.S. Appl. No. 13/470,847, filed May 14, 2012.

V. Kashyap; "IP Over InfiniBand (IPoIB) Architecture", The Internet Society; 2006; 22 pages, May 5, 2014.

University of Tennessee; "Message Passing Interface Forum"; Sep. 4, 2009, 647 pages.

Notice of Allowance in related U.S. Appl. No. 13/470,847, mailed on Apr. 14, 2014; 19 pages.

Final Office Action in related U.S. Appl. No. 13/529,452, mailed on May 12, 2014; 23 pages.

\* cited by examiner

SPECULATION BASED APPROACH FOR RELIABLE MESSAGE COMMUNICATIONS

FIELD OF THE INVENTION

The present invention relates generally to data networks, and more specifically, to messaging techniques related to data delivery between processing nodes in a network environment.

BACKGROUND

Data centers are generally centralized facilities that provide Internet and intranet services supporting businesses and organizations. A typical data center can house various types of electronic equipment, such as computers which may include servers of various types (e.g., domain name system (DNS) servers), network switches, routers, data storage devices, and so on. A given data center can have hundreds or thousands of interconnected server nodes communicating with each other and external devices via a switching architecture comprising switches, routers, etc. The server nodes can communicate with each other according to established messaging schemes. However, such messaging schemes do not consider the state of the receiver of the messages. In particular, when a receiving server node is unable to process incoming packets due to insufficient packet buffers, overflow conditions, and the like, backpressure may occur causing the receiver to drop packets.

BRIEF SUMMARY OF EMBODIMENTS

In accordance with embodiments of the inventive concepts, there is provided a system and method that include a multi-layer software stack, which includes an RDMA messaging interface module between an RDMA-capable network interface and the upper layers of the software stack. Thus, a simple messaging interface such as a TCP/IP-compliant interface can be supported for transporting upper layer data, even though the physical layer is RDMA-capable. Here, message transfers can be established with a remote node in an efficient manner while reducing the amount of buffering required at the switch fabric and also preventing congestion collapse from occurring.

In accordance with an aspect, there is provided a computer-implemented method for lossless message delivery from a first processing device to a second processing device. The method comprises providing, at each of the first processing device and the second processing device, a remote direct memory access (RDMA) messaging interface. The RDMA messaging interface at the first processing device generates one or more messages that is processed by the RDMA messaging interface of the second processing device. The RDMA messaging interface of the first processing device outputs a notification to the second processing device that a message of the one or more messages is available at the first processing device. A determination is made that the second processing device has resources to accommodate the message. The second processing device performs a first operation in response to determining that the second processing device has the resources to accommodate the message.

In accordance with another aspect, there is provided a computer-implemented method for message communications between a first processing device and a second processing device, comprising. At each of the first processing device and the second processing device, an RDMA messaging interface is provided. The RDMA messaging interface at the first processing device generates one or more messages that is processed by the RDMA messaging interface of the second processing device. The RDMA messaging interfaces of the first and second processing devices are placed in a first mode of operation. The first mode of operation includes outputting, by the RDMA messaging interface of the first processing device, a notification to the second processing device that a message of the one or more messages is available at the first processing device. The first mode of operation further includes delaying the performance of an operation by the second processing device of the message until the second processing device has available resources to processing the message.

In accordance with another aspect, there is provided a processing node. A message transport layer establishes message communications with another processing node. An RDMA-capable network interface converts the message communications into electronic signals for transmission over a physical network media to the other processing device. An RDMA messaging interface module is between the message transport layer and the network interface. The RDMA messaging interface integrates the message communications with RDMA-capable communications for output to the other processing node.

In accordance with another aspect, there is provided a server aggregation system, comprising: a source processing node, a destination processing node, and a network device. The source processing node comprises a message transport layer for establishing message communications with a destination processing node, an RDMA-capable network interface for converting the message communications into electronic signals for transmission over a physical network media to the destination processing device, and an RDMA messaging interface module between the message transport layer and the network interface. The RDMA messaging interface integrates the message communications with RDMA-capable communications for output to the destination processing node. The destination processing node comprises a message transport layer for establishing message communications with the source processing node, an RDMA-capable network interface for converting the message communications into electronic signals for transmission over a physical network media to the source processing device, and an RDMA messaging interface module between the message transport layer and the network interface. The RDMA messaging interface integrates the message communications with RDMA-capable communications for output to the source processing node. The network device exchanges the message communications between the source processing node and the destination processing node.

In accordance with another aspect, there is provided a computer program product comprising a computer readable storage medium having computer readable program code embodied therewith. The computer readable program code comprises computer readable program code related to an RDMA messaging interface configured to generate one or more messages that is processed by a RDMA messaging interface of a destination processing device; computer readable program code related to the RDMA messaging interface configured to output a notification to the destination processing device that a message of the one or more messages is available; computer readable program code configured to determine that the second processing device has resources to accommodate the message; and computer readable program code configured to perform at the second processing device a first operation in response to determining that the second processing device has the resources to accommodate the message.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION OF EMBODIMENTS

Figure 1:
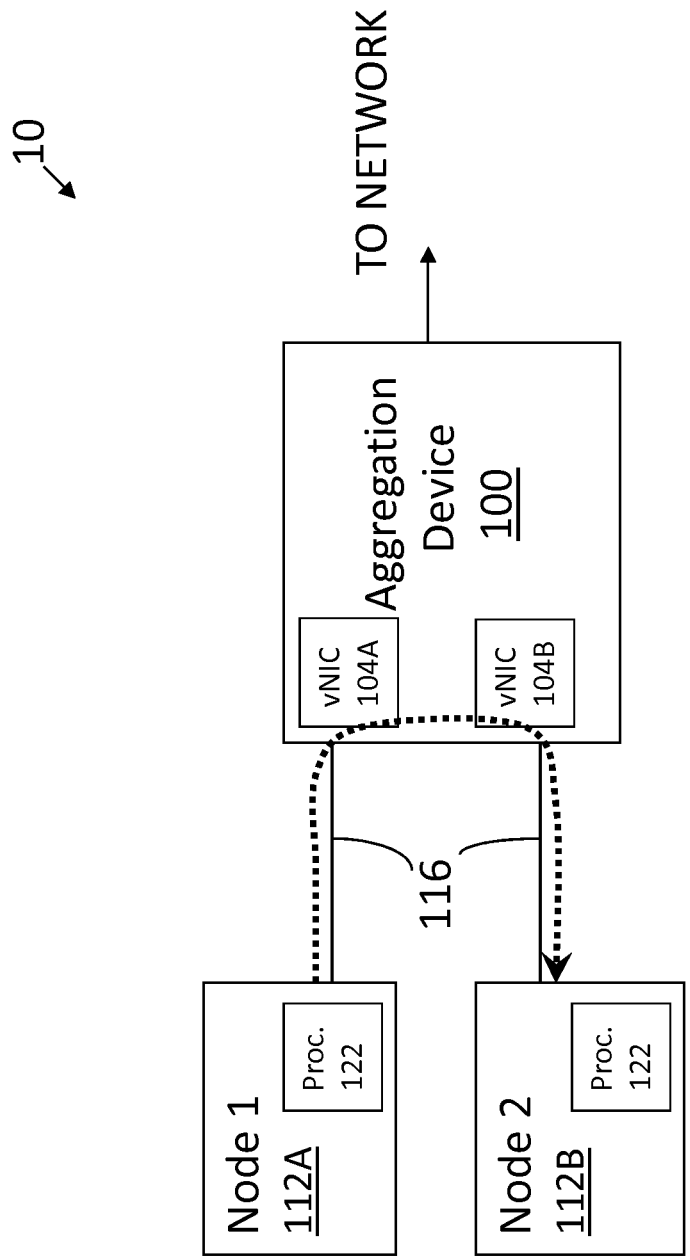
FIG. 1 is a diagram of a computing infrastructure, in which embodiments of the present inventive concepts can be practiced.

In the following description, specific details are set forth although it should be appreciated by one of ordinary skill that the systems and methods can be practiced without at least some of the details. In some instances, known features or processes are not described in detail so as not to obscure the present invention.

Several different data transfer technologies are readily available between host computers, servers, network switches, and related electronic devices in a network environment. The Transmission Control Protocol (TCP) and Internet Protocol (IP) protocols over an Ethernet physical network technology is widely deployed for exchanging message data in packets and the like in network environments, such as the internet. However, such messaging schemes do not consider the state of the receiver of the messages. In particular, when a receiving server node is unable to process incoming packets due to insufficient packet buffers, overflow conditions, and the like, backpressure may occur causing the receiver to drop packets.

A typical workaround is to add buffers at the switch fabric to temporarily stage the received packets. However, extra storage at the switch may not prevent backpressure-related issues from occurring, for example, negatively impact other unrelated packet flows through the switch fabric. Also, congestion collapse can occur, which can negatively impact even those packets transmitted to receivers configured with sufficient receive buffers. It is therefore desirable for a solution that reduces the amount of buffering required at a switch fabric, and that also reduces or prevents congestion collapse at the switch fabric.

Remote direct memory access (RDMA) is a technology that provides a direct transfer of data from the memory of one computer, e.g., a source processing node, to the memory of another computer, e.g., a destination processing node, with little or no involvement required of the operating system or the central processing unit (CPU), i.e., host processor, of either the source or destination processing nodes, permitting high throughput, low latency data exchanges to occur.

The Infiniband™ architecture uses RDMA to provide a direct interface to upper layers of software interfacing with the operating system and applications of the source and destination processing nodes, respectively. Message data packets can be encoded using TCP, and layered on IP on Infiniband™ (IPoIB) or related interconnect layer for transmission across a network. Although IPoIB provides a messaging interface for a TCP/IP networking stack to exchange message data, IPoIB does not take into account the state of the destination processing node before IP packets are transmitted to the destination node. Moreover, IPoIB functions similarly to Ethernet, and does not exploit the features of RDMA with respect to IP packet transmissions. Thus, packets are dropped when receive buffers at the destination node are full, which can result in packet retransmits and consequently poor performance.

The present inventive concepts provide a system and method that utilizes features of RDMA to permit upper software layers of source and destination processing nodes interconnected via, for example, a switch fabric, aggregation device, interconnect device, or related network device to exchange messages with each other in a reliable, efficient manner, for example, eliminating or reducing the risk of dropped packets during a message exchange.

A processing node is constructed and arranged to include a multi-layer software stack for network communications. The stack in accordance with preferred embodiments includes an RDMA messaging interface module that includes a messaging RDMA driver between an RDMA-capable network interface, and the upper layers of the software stack, such as an IP layer. The RDMA messaging interface module can communicate with a device driver and the like to appear to an upper software layer as an Ethernet driver, when in fact the RDMA messaging interface module uses RDMA to send "Ethernet-like" messages to a receiving device. In doing so, RDMA provides a same or similar interface to the upper layers as an Ethernet driver, even though RDMA provides the underlying interconnect technology. Thus, a simple messaging interface such as a TCP/IP-compliant interface can be supported for transporting upper layer data, even though the physical layer is RDMA-capable, as distinguished from Ethernet and the like.

In accordance with embodiments of some aspects of the present inventive concepts, message transfers can be established with a remote node in an efficient manner while reducing the amount of buffering required at the switch fabric and also preventing congestion collapse from occurring. The messaging over RDMA scheme also eliminates packet drops at a remote device and greatly reduces the amount of buffer memory required within the switch device, because the source device does not send packets without regard to the status of the destination device. Instead, an exchange of data occurs where the receiving node in accordance with RDMA first determines whether it has sufficient receive buffers available, then notifies the source node after reading the buffer data. Another feature is that few or fewer memory resources such as buffers are required at the network device, e.g., switch fabric, are required relative to current techniques. Less buffering is required because the source device knows whether the destination device has sufficient resources for receiving and processing data, obviating the need to drop packets.

Another feature that may be included in some embodiments is that the fragmentation and reassembly of large messages is obviated since an RDMA-capable interconnect does not constrain a frame size to 1500 bytes, as with Ethernet.

FIG. 1 is a diagram of a computing infrastructure 10, in which embodiments of the present inventive concepts can be practiced. In the computing infrastructure 10, a first processing node 112A and a second processing node 112B (generally, 112) can each be connected to an aggregation device 100 via a communication path 116, for example, including a peripheral component interconnect express (PCIe) connection. The aggregation device 100 can communicate with the processing nodes 112 via a plurality of I/O ports. The aggregation device 100 can include a switch fabric and the like for the exchange of data between the attached processing nodes 112 and/or remote locations via a NIC, router, or other network device (not shown) attached to the aggregation device 100. The aggregation device 100 can provide virtual NICs (vNICs) 104A, 104B, or related switching elements, for providing interconnections between the first and second processing nodes 112A, 112B.

The processing nodes 112 can each include a single socket server or related microprocessor device. The processing node 112 includes one or more processors 122, for example, central processing units (CPUs), graphics processing units (GPUs), digital signal processors (DSPs), application-specific integrated circuits (ASICs), memory controllers, multi-core processors, bus adapters, or other types of microprocessors, or combinations of these and other devices. The processing nodes 112 can be configured for virtualization, for example, including guest virtual machines (VM), a hypervisor, and/or related virtual elements. Accordingly, the processing nodes 112 can be configured as a processor cluster or other well-known arrangement, and can share resources such as memory, a network adaptor, basic input/output system (BIOS), and so on.

In an embodiment, the first processing node 112A and the second processing node 112B communicate with each other according to RDMA, allowing each to directly communicate with the other's local memory, and to move buffers between applications residing at the first and second processing nodes 112A, 112B, respectively. Each processing node 112A, 112B is constructed and arranged to perform messaging, for example, exchanging TCP/IP messages, over RDMA. In doing so, processing node 112A can provide memory locations and other relevant message data to a receiving node, i.e., processing node 112B. Processing node 112B in turn can use RDMA to read data at the provided memory locations, subject to resource availability at processing node 112. Processing node 112A can perform an RDMA write operation at processing node 112B, in response to processing node 112B providing pre-posted receive buffers for the processing node 112A.

Figure 2:
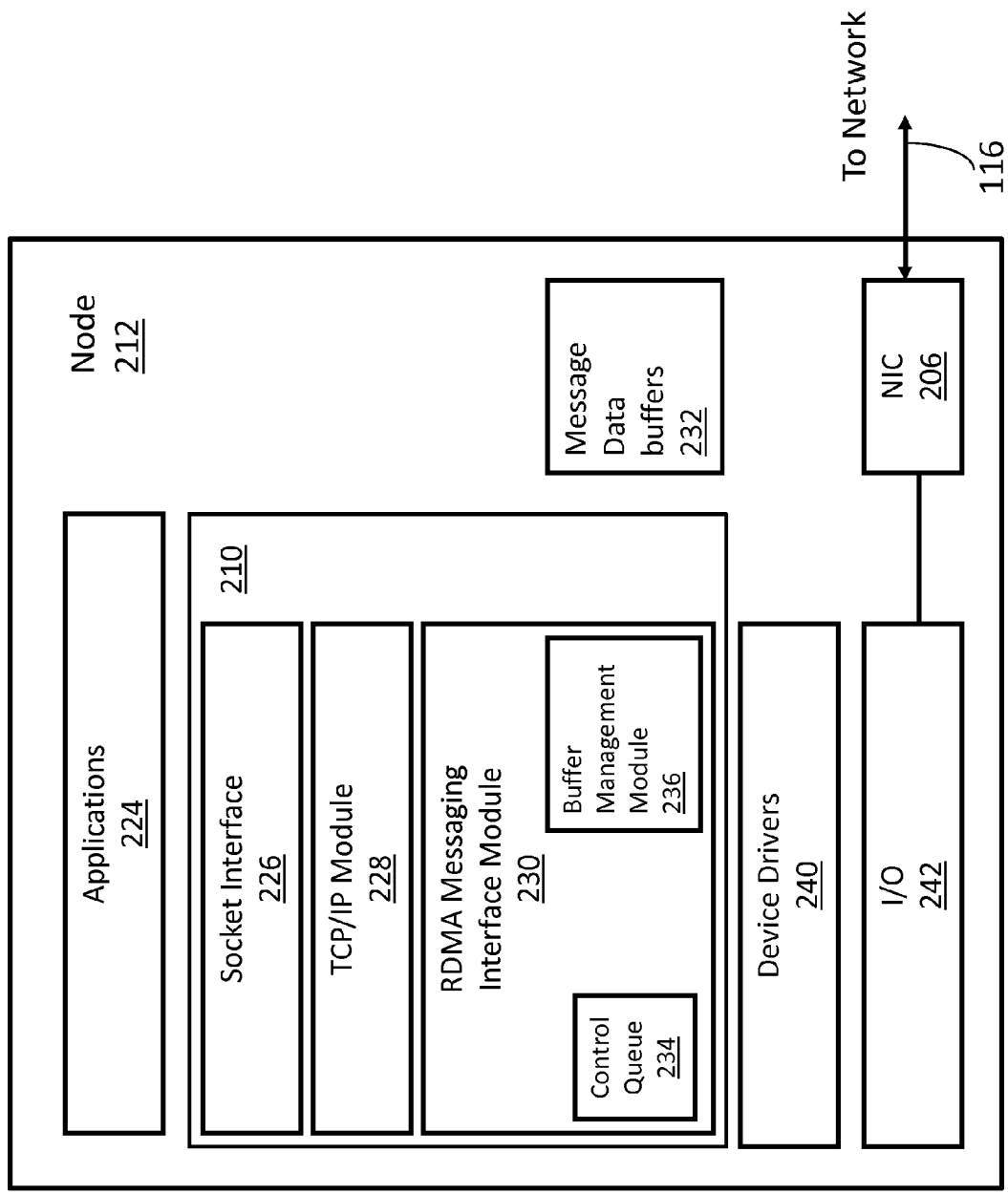
FIG. 2 is a block diagram of a processing node, in accordance with an embodiment.

FIG. 2 is a block diagram of a processing node 212, in accordance with an embodiment. The processing node 212 can be similar or the same as the processing nodes 112 described at FIG.1.

The processing node 212 can include non-volatile or volatile memory, for example, dynamic random access memory (DRAM) or static RAM (SRAM). Stored at the local memory can include program code, such as program code related to one or more software elements of the processing node 212, for example, applications 224. The local memory 104 can also include one or more virtual machines (VMs), virtual NICs, a hypervisor, and/or other virtualization elements, permitting different processing environments to occur at the processing node 212. A processor, for example processor 122 shown in FIG. 1, can execute instructions related to the program code. The instructions can be read into the local memory from another device, for example, another processing node. Execution of the instructions permits the processing node 212 to perform the process steps described herein.

The RDMA messaging stack 210 can comprise a set of software layers, including but not limited to a socket interface 226, a message transport layer, for example, including a TCP/IP module 228, and an RDMA messaging interface module 230. The RDMA messaging stack 210 can be layered on one or more device drivers 240, which in turn, communicate with an I/O 242 for exchanging communications with a NIC 206 or other physical device.

The socket interface 226 can provide an interface from the applications 224 to the TCP/IP module 228.

The RDMA messaging interface module 230 can include a driver for providing a messaging interface with respect to upper software layers, as well as an RDMA interface. The RDMA messaging interface module can generate lossless messages to a destination device by capitalizing on the features of RDMA provided at the RDMA-capable NIC 206.

The processing node 212 can include a plurality of message data buffers 232 at a system memory (not shown) for temporarily storing data received at the processing node 212. The message data buffers 232 can include transmit buffers, or source buffers, and/or receive buffers. The message data buffers 232 can be constructed and arranged as ring buffers and the like defined in the memory for processing the data for performing data transmit and/or receive operations.

In an embodiment, the processing node 212 is configured as a source node for transmitting data to a destination node. Here, the message data buffers 232 can include one or more pre-posted receive buffers that are provided by the receiving node based on a speculation that the source node 212 will send additional messages to the destination node even after the destination node acknowledges that it completed an RDMA read operation with respect to a current message.

The RDMA messaging interface module 230 can include a control queue 234 that receives and stores notification records that include metadata, transmit and/or receive descriptors and/or other information relevant to performing a messaging operation over RDMA. The notification records can include memory address information for locating buffers and related data. A control queue 234 can be provided for each TCP port. In an embodiment, the control queue 234 is constructed and arranged to provide capacity to store notification records corresponding to one or more data packets, frames, cells, or other unit of data. The control queue 234 is not required to store the data payload to which the record corresponds. The payload data can be stored at source buffers 232, or other memory locations.

The RDMA messaging interface module 230 can include a buffer management module 236 that can generate and/or post descriptors, security keys, offset information, commands, metadata, or other information that identify available locations at the message data buffers 232. This information can indicate where in the local memory a buffer resides, the size of the buffer, and other relevant data. This information can be stored at the control queue 234, for example, in response to a notification. The buffer management module 236 can manage the allocation of available buffers. For example, as described in FIGS. 6 and 7, the buffer management module 236 at a receiving processing node can communicate with the RDMA messaging interface module 230 to send buffer locations to the source processing node based on the speculation that the source node will send additional messages as well as information regarding buffer availability at the receiving processing node.

Figure 3:
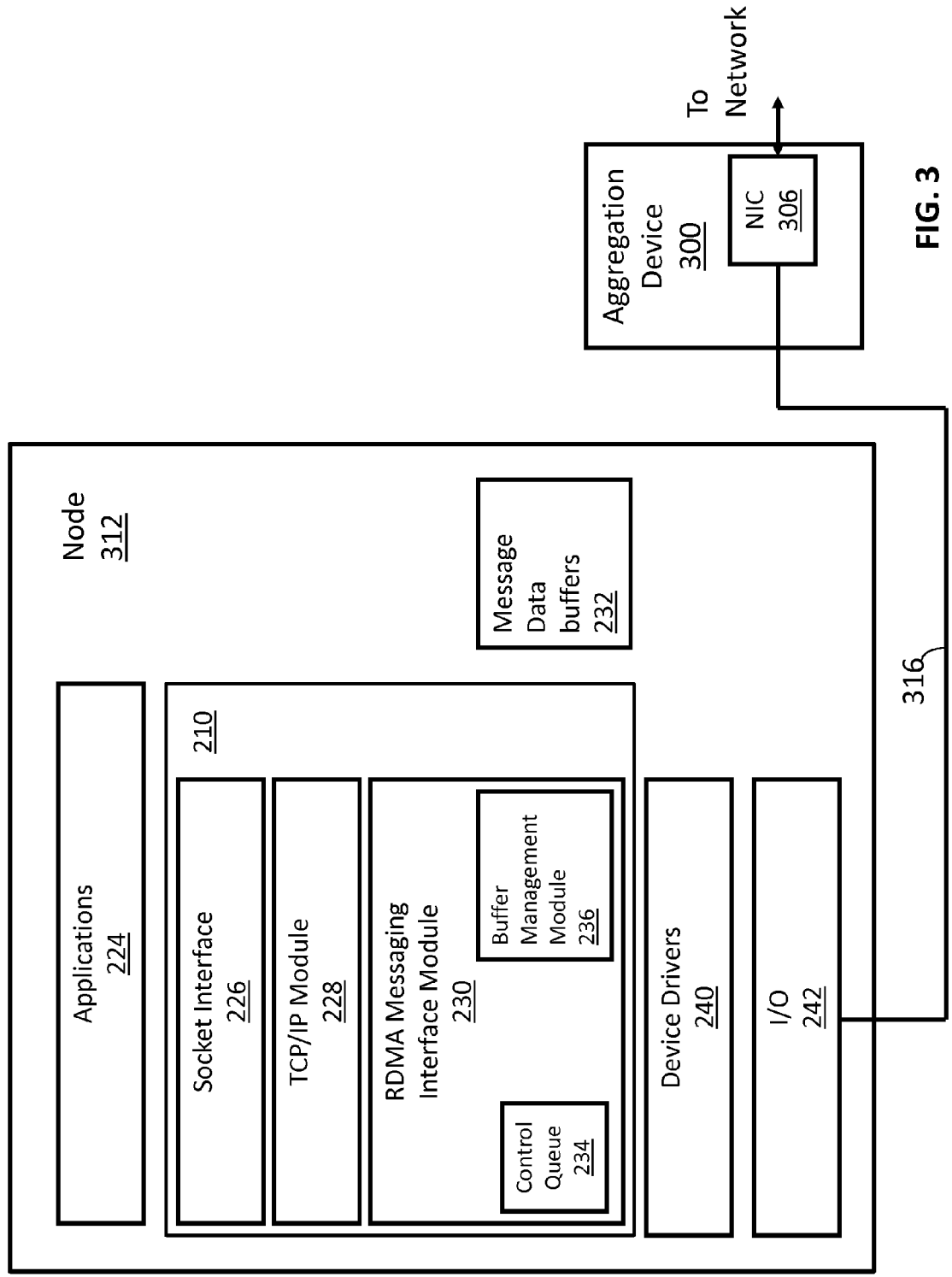
FIG. 3 is a block diagram of a virtualized processing node, in accordance with an embodiment.

The processing node 212 can include a NIC 206 that communicates with the I/O module 242 and device drivers 240 for managing data transfers between the processing node 212 and a network device such as a switch or the aggregation system 100 of FIG. 1, and for performing other I/O functions known to those of ordinary skill in the art. The NIC 206 can include an Ethernet interface, a PCIe interface, and/or other network connectors, interfaces, and the like that provide a unidirectional or bi-directional communication path 116 with a remote device. The NIC 206 can be part of the processing node 212 as shown in FIG. 2. In other embodiments, for example, shown in FIG. 3, a processing node 312 communicates with a network interface that is external to the processing node 312, for example, a NIC 306 at an aggregation device 300, for example, described at U.S. patent application Ser. No. 13/526,973 filed Jun. 19, 2012 entitled "Devices and Methods for Interconnecting Server Nodes," U.S. patent application Ser. No. 13/529,452 filed Jun. 21, 2012 entitled "Memory Switch for Interconnecting Server Nodes," and U.S. patent application Ser. No. 13/470,847 filed May 14, 2012, entitled"Server Node Interconnect Devices and Methods,"the contents of each of which is incorporated by reference herein in its entirety, or a network interface at a network switch or related device. A data path 316 over a communication channel, for example, a PCIe connection or the like, can be provided from the processing node 312, or a virtual device (not shown) of the processing node 312, to the external network interface. Other than the absence of a NIC, the processing node 312 can be similar to the processing node 212 of FIG. 2, so details are not repeated for brevity.

Figure 4:
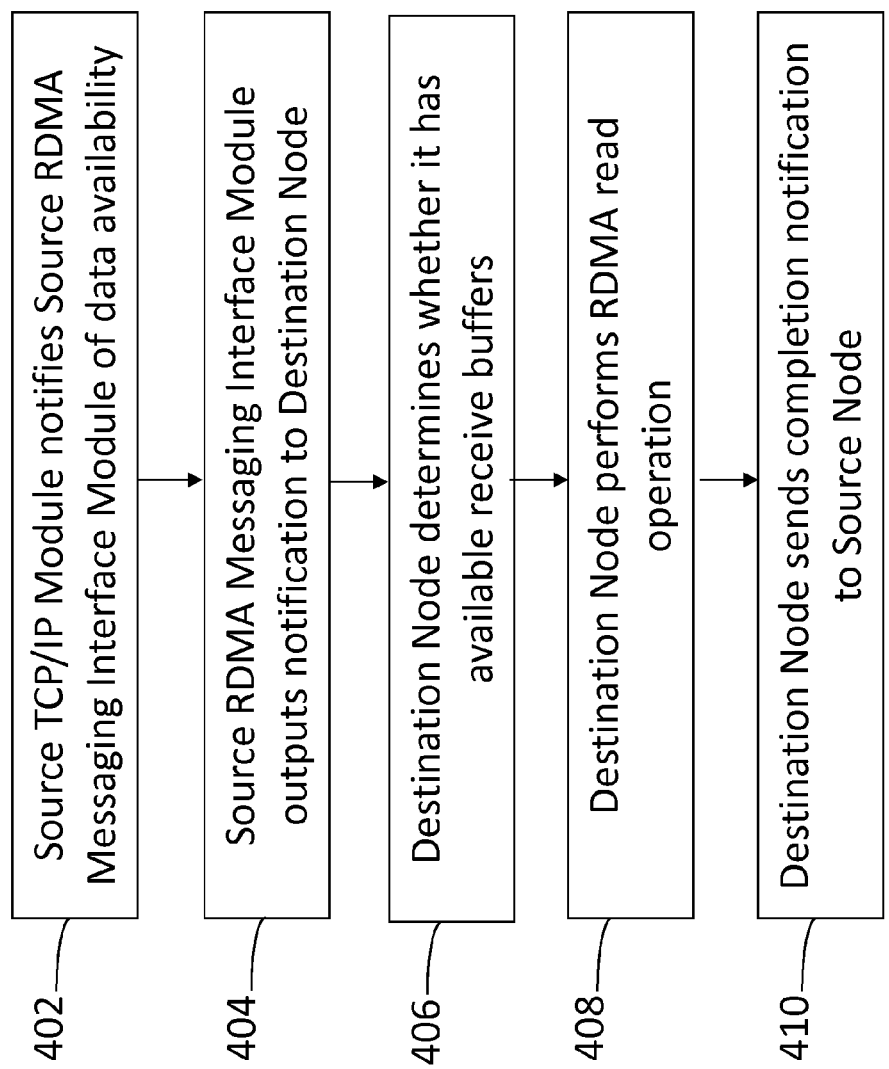
FIG. 4 is a flow diagram of a method for message communications between processing nodes, in accordance with an embodiment.
Figure 5:
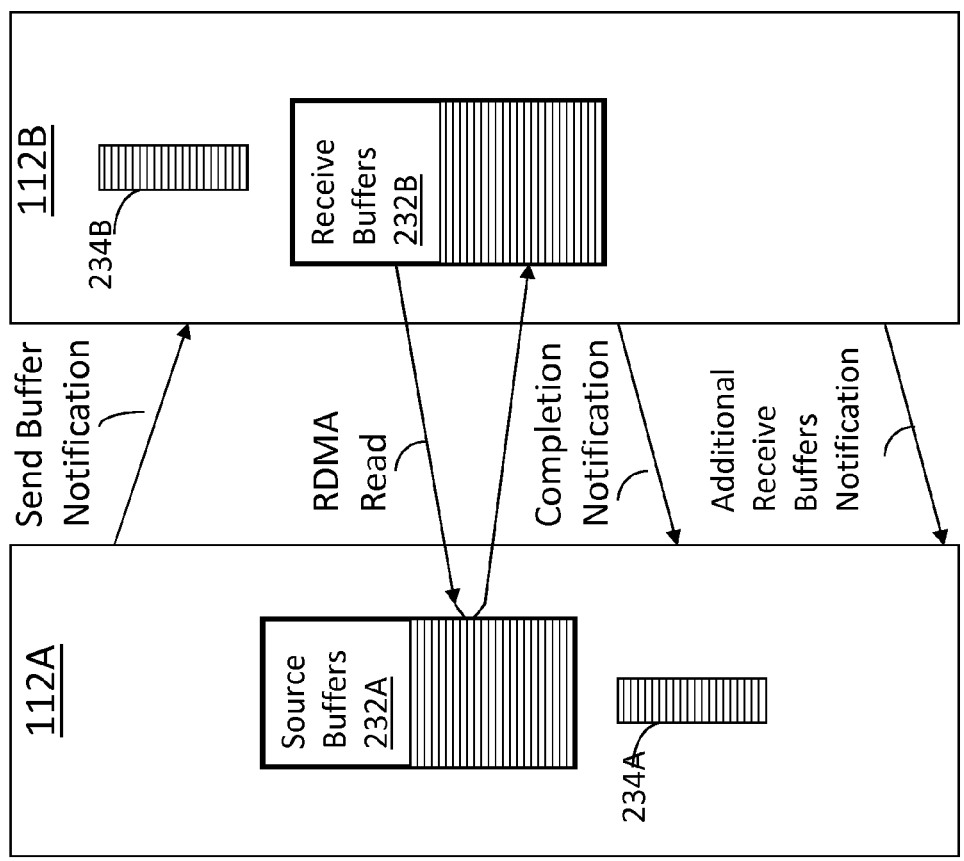
FIG. 5 is an illustration of data flow paths between a source processing node and a destination processing node performed according to the method of FIG. 4, in accordance with an embodiment.

FIG. 4 is a flow diagram of a method 400 for message communications between processing nodes, in accordance with an embodiment. In describing the method 400, reference is made to elements of FIGS. 1-3. The method 400 can be governed by instructions that are stored in the local memory of the source processing node 112A and the destination processing node 112B shown in FIG. 1, and/or the processing nodes 212, 213 shown in FIGS. 2 and 3, respectively. Some or all of the method 400 can be performed on-die, at an ASIC, a system-on-a-chip (SOC), or a related device. FIG. 5 is an illustration of data flow paths between a source processing node, for example, node 112A of FIG. 1, and a destination processing node, for example, node 112B of FIG. 1, which can be performed according to the method 400. In performing some or all of the method 400, a processing node can be referred to as being in a basic mode.

At block 402, a TCP/IP module 228 at the source processing node 112A notifies a RDMA messaging interface module 230 at the source processing node 112A that a message is available for transmission to the destination processing node 112B.

At block 404, a notification can be output from the source RDMA messaging interface module 230 to a control queue 234 at the destination processing node 112B, indicating that data is available at the source processing node 112A for processing by the destination processing node 112B. The notification can include a location of the data at a source message data buffer 232, also referred to as a send buffer, for retrieval by the destination processing node 112B.

At block 406, the destination processing node 112B determines whether it has available receive buffers where the data can be placed in an RDMA read operation. The buffer management module 236 can monitor buffer availability and wait for receive buffers to be posted, ensuring that sufficient buffers are available to receive message data from the source processing node 112A.

At block 408, the destination processing node 112B performs an RDMA read operation when it determines that it has sufficient receive buffers available. Here, the message data can be transferred to one or more receive message data buffers 232 at the destination processing node 112B.

At block 410, the destination processing node 112B sends a notification to the source processing node 112A that the destination processing node 112B has completed the RDMA read operation on the message data. The completion notification can be placed in a control queue 234A at the source processing node 112A. The completion notification can be processed by the source processing node 112A to reallocate, or otherwise release, the buffers used for storing the message data read by the receiving processing node 112B.

The destination processing node 112B can also send a notification requesting additional buffers based on the speculation that the source processing node 112A will send additional messages to the destination processing node 112B.

Figure 6:
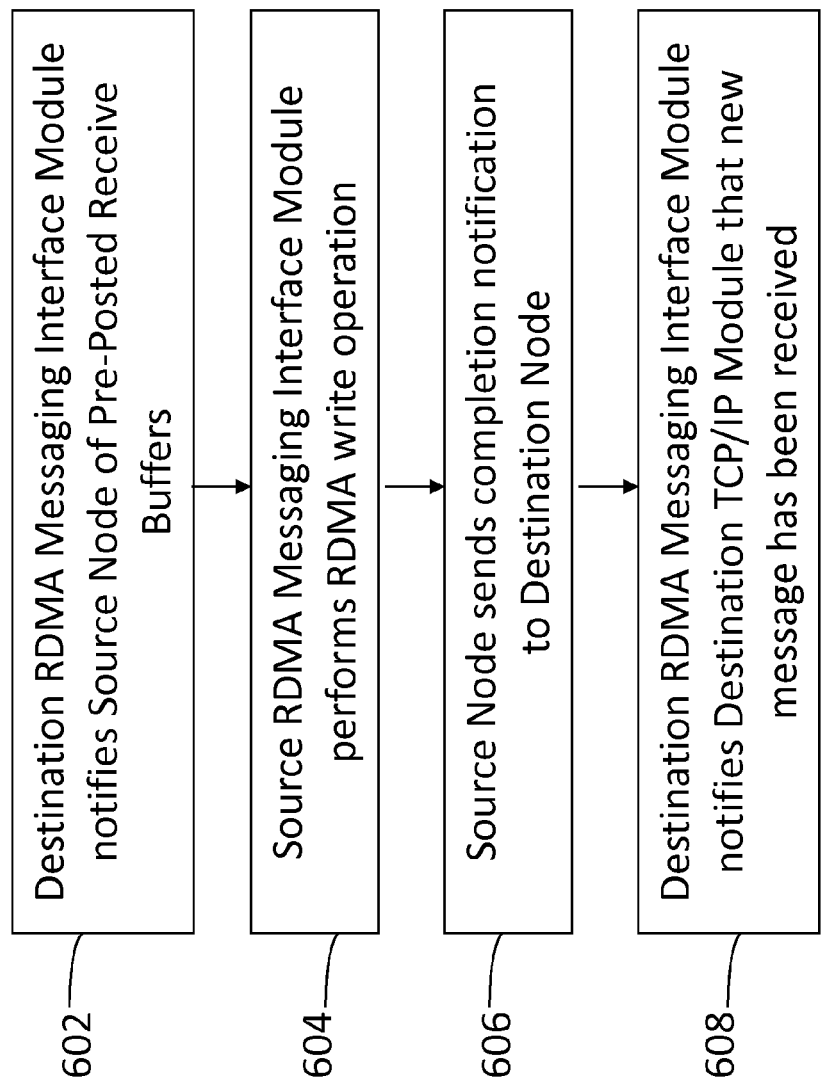
FIG. 6 is a flow diagram of a method for message communications between processing nodes, in accordance with another embodiment.
Figure 7:
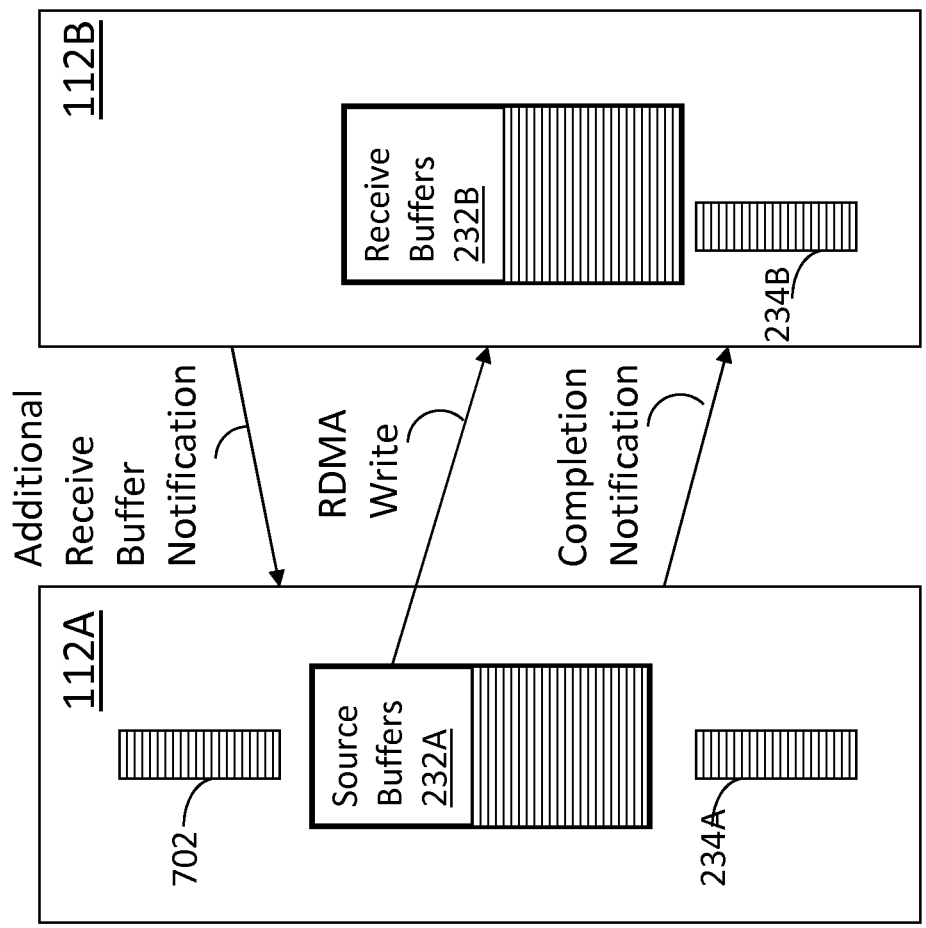
FIG. 7 is an illustration of data flow paths between a source processing node and a destination processing node performed according to the method of FIG. 6, in accordance with an embodiment.

FIG. 6 is a flow diagram of a method 600 for message communications between processing nodes, in accordance with another embodiment. In describing the method 600, reference is made to elements of FIGS. 1-5. The method 600 can be performed after the method 400 described with reference to FIGS. 4 and 5. The method 600 can be governed by instructions that are stored in the local memory of the source processing node 112A and the destination processing node 112B shown in FIG. 1, and/or the processing nodes 212, 213 shown in FIGS. 2 and 3, respectively. Some or all of the method 600 can be performed on-die, at an ASIC, a system-on-a-chip (SOC), or a related device. FIG. 7 is an illustration of data flow paths between a source processing node, for example, node 112A of FIG. 1, and a destination processing node, for example, node 112B of FIG. 1, which can be performed according to the method 600. In performing some or all of the method 600, a processing node can be referred to as being in an optimized mode. In performing the method 600, there is no need for an explicit notification to be generated from a source processing node to a destination processing node, thereby reducing a delay in data delivery.

In addition to sending a completion notification as specified in block 410 of method 400, the RDMA messaging interface module 230 at the destination processing node 112B can speculatively provide one or more additional receive buffers 702, or more specifically, pointers to additional buffer locations, to the source processing node 112A, subject to buffer availability at the receiving processing node 112B. At block 602, the RDMA messaging interface module 230 at the destination processing node 112B sends a notification to the source processing node 112A, which includes additional buffer locations. The buffers 702, also referred to as pre-posted receive buffers, can be provided based on a speculation, or assumption, that the source processing node 112A can continue to send additional messages to the destination processing node 112B. In doing so, there is no need for the source processing node 112A to generate an explicit request to the destination processing node 112B for additional buffers, thereby reducing the risk of delay of data delivery to the destination processing node 112B. A pre-posted receive buffer 702 can provide locations for pointers, metadata, or other identifiers corresponding to a remote receive buffer 234B. A one-to-one correspondence can be formed between a pre-posted receive buffer 702 and a remote receive buffer 234B. During an operation, when a buffer 234B has data to send to the destination processing node 112B, it can retrieve relevant identifiers from the pre-posted receive buffer 702, then use this information to process the data, for example, provide the payload data to the appropriate receive buffer 234B.

At block 604, the RDMA messaging interface module 230 of the source processing node 112A performs an RDMA write operation. The source RDMA messaging interface module 230 can maintain the pre-posted receive buffers 702 and use them to directly send the data to the receive buffers 232B at the destination processing node 112B on a subsequent data transmit, as distinguished from sending an explicit read notification as shown and described at FIGS. 4 and 5.

At block 606, the source RDMA messaging interface module 230 sends a completion notification to the destination processing node 112A after the RDMA write operation is completed. The completion notification can be placed in a control queue 234B at the source processing node 112A. The RDMA messaging interface module 230 at the destination processing node 112B, at block 608, can notify the destination TCP/IP module 228 that a new message has been received. The pre-posted receive buffers 702 can be replenished by the destination RDMA messaging interface module 230. For example, pointers, address information, etc. can be provided for future allocation to the buffer 702, which can continue to send additional receive buffer notifications to the source node.

Figure 8:
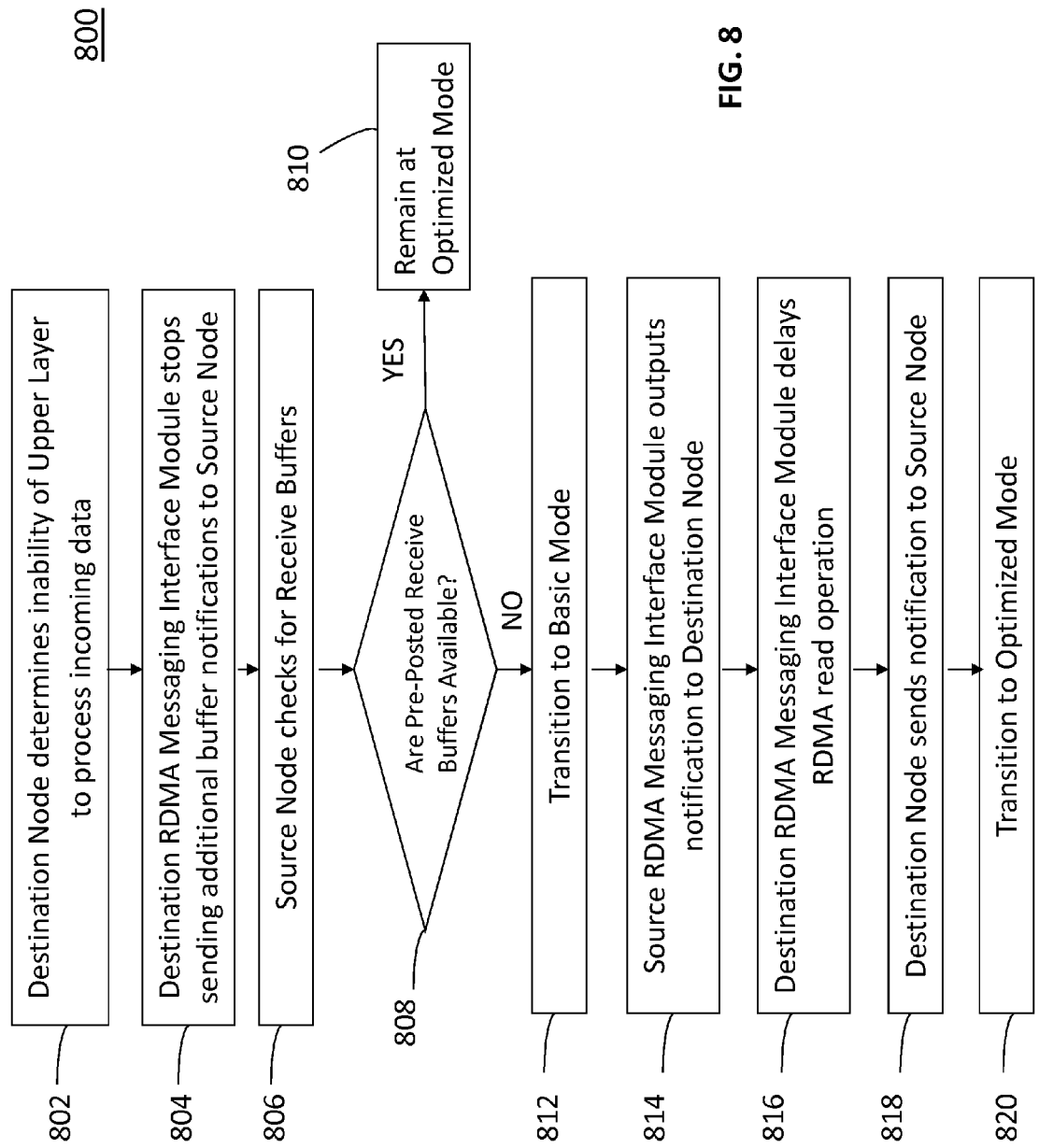
FIG. 8 is a flow diagram of a method for transitioning a processing node between modes of operation.

FIG. 8 is a flow diagram of a method 400 for transitioning a processing node between modes of operation. In describing the method 800, reference is made to elements of FIGS. 1-7. The method 800 can be performed after the method 400 described with reference to FIGS. 4 and 5 and/or the method 600 described with reference to FIGS. 6 and 7. The method 800 can be governed by instructions that are stored in the local memory of the source processing node 112A and the destination processing node 112B shown in FIG. 1, and/or the processing nodes 212, 213 shown in FIGS. 2 and 3, respectively. Some or all of the method 800 can be performed on-die, at an ASIC, a system-on-a-chip (SOC), or a related device. FIG. 8 is an illustration of data flow paths between a source processing node, for example, node 112A of FIG. 1, and a destination processing node, for example, node 112B of FIG. 1, which can be performed according to the method 800.

At the start of method 800, the source and destination processing nodes 112A, 112B are preferably in an optimized mode of operation, referred to above with regard to FIGS. 6 and 7. At block 802, the destination processing node 112B can determine that one or more upper layers of software are unable to adequately process incoming data. For example, the destination processing node 112B can establish that the TCP/IP module 228 is processing received messages at a rate that is less than a predetermined threshold rate. The predetermined threshold rate can be user-defined, or automatically determined according to availability of the receive buffers, a consumption rate by the TCP/IP module 228, and the like.

At block 804, the destination RDMA Messaging Interface Module 230 can stop the speculative sending of additional buffer notifications to the source processing node 112B, for example, in response to a determination that an upper layer software module is processing received messages at a rate that is less than a predetermined threshold rate.

At block 806, the source processing node 112A can check for pre-posted receive buffers. At decision diamond 808, a determination is made whether one or more pre-posted receive buffers are available for the source processing node 112A. The buffer management module 236 in communication with the source RDMA messaging interface module 230 can establish whether pre-posted receive buffers are available. If at least one pre-posted receive buffer is available, then at block 810 the source processing node 112A remains at the optimized mode of operation. Otherwise, the method 800 proceeds to block 812, where the source processing node 112A can seamlessly transition to the basic mode of operation, described above with regard to FIGS. 4 and 5.

At block 814, a notification can be output from the source RDMA messaging interface module 230 to a control queue 234 at the destination processing node 112B, similar to method step 404 described with reference to FIGS. 4 and 5.

At block 816, the destination RDMA messaging interface module 230 can delay an RDMA read operation and a subsequent completion notification to the source processing node 112A until the upper layer software completes processing received data, for example, data received for an RDMA read or write operation.

At block 818, the destination RDMA messaging interface module 230 sends a completion notification to the source processing node 112A.

At block 820, at a later time, depending on buffer availability, the destination processing node 112B can switch to the optimized mode. Accordingly the transition between the basic mode and the optimized mode can be seamless and automatic.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A computer-implemented method for message delivery from a first processing device to a second processing device, comprising:
    providing, at each of the first processing device and the second processing device, a remote direct memory access (RDMA) messaging interface, the RDMA messaging interface at the first processing device generating one or more messages that is processed by the RDMA messaging interface of the second processing device, wherein each of the RDMA messaging interfaces is positioned between an RDMA-capable network interface and a message transport layer in the corresponding processing device, each RDMA-capable network interface providing driver features to the corresponding message transport layer to appear as a corresponding driver to the message transport layer;
    outputting, by the RDMA messaging interface of the first processing device, a notification to the second processing device that a message of the one or more messages is available at the first processing device;
    determining that the second processing device has resources to accommodate the message; and
    performing, by the second processing device, a first operation in response to determining that the second processing device has the resources to accommodate the message.

2. The computer-implemented method of claim 1, further comprising:
    determining that the first operation is completed; and
    notifying, by the second processing device, the first processing device that the first operation is completed.

3. The computer-implemented method of claim 1, further comprising:
    outputting, by the RDMA messaging interface of the second processing device, a notification to the first processing device, the notification indicating the availability of additional receive buffers for the first processing device; and
    performing, by the second processing device, a second operation in response to the availability of the additional buffers.

4. The computer-implemented method of claim 3, wherein the second operation is an RDMA write operation.

5. The computer-implemented method of claim 3, wherein the additional receive buffers are provided by the second processing device based on a speculation that the first processing device will send additional messages to the second processing device.

6. The computer-implemented method of claim 3, further comprising:
    determining that the second operation is completed; and
    notifying, by the first processing device, the second processing device that the second operation is completed.

7. The computer-implemented method of claim 6, further comprising:

replenishing, by the RDMA messaging interface of the second processing device, the additional receive buffers in response to determining that the second operation is completed.

8. The computer-implemented method of claim 3, further comprising:
determining the unavailability of the additional receive buffers for the first processing device due to the resources processing a first message of the one or more message at the second processing device;
placing the RDMA messaging interfaces of the first and second processing devices in a first mode of operation, wherein the first mode of operation includes outputting, by the RDMA messaging interface of the first processing device, a second notification to the second processing device that a second message of the one or more messages is available at the first processing device; and
delaying the performance of an operation by the second processing device on the second message until the resources complete the processing of the first message.

9. The computer-implemented method of claim 8, further comprising:
transitioning the RDMA messaging interfaces of the first and second processing devices to a second mode of operation, wherein performing the second mode of operation includes:
outputting, by the RDMA messaging interface of the second processing device, the notification indicating the availability of additional receive buffers for the first processing device.

10. The computer-implemented method of claim 1, wherein the message transport layer includes a Transmission Control Protocol (TCP) protocol layer.

11. The computer-implemented method of claim 1, wherein the message transport layer is positioned on an Internet Protocol (IP) layer.

12. The computer-implemented method of claim 1, wherein the notification includes an address location at the first processing device that includes a data payload related to the message.

13. The computer-implemented method of claim 1, wherein the first and second processing devices are each in communication with an aggregation device.

14. The computer-implemented method of claim 13, wherein the RDMA messaging interface at the first processing device and the RDMA messaging interface of the second processing device communicate with each other across a PCIe connection.

15. The computer-implemented method of claim 1, further comprising:
outputting, by the RDMA messaging interface at the second processing device, a response to the RDMA messaging interface at the first processing device in response to determining that the second processing device has the resources to accommodate the message.

16. A computer-implemented method for message communications between a first processing device and a second processing device, comprising:
providing, at each of the first processing device and the second processing device, an RDMA messaging interface, the RDMA messaging interface at the first processing device generating one or more messages that is processed by the RDMA messaging interface of the second processing device, wherein each RDMA messaging interface is positioned between an RDMA-capable network interface and a message transport layer in the corresponding processing device, each RDMA-capable network interface providing driver features to the corresponding message transport layer to appear as a corresponding driver to the message transport layer;
placing the RDMA messaging interfaces of the first and second processing devices in a first mode of operation, the first mode of operation including outputting, by the RDMA messaging interface of the first processing device, a notification to the second processing device that a message of the one or more messages is available at the first processing device; and
delaying an operation by the second processing device of the message until the second processing device has available resources to processing the message.

17. The computer-implemented method of claim 16, further comprising:
transitioning the RDMA messaging interfaces of the first and second processing devices to a second mode of operation, the second mode of operation including:
outputting, by the RDMA messaging interface of the second processing device, a notification indicating the availability of additional receive buffers for the first processing device.

18. The computer-implemented method of claim 17, wherein the additional receive buffers are provided by the second processing device based on a speculation that the first processing device will send additional messages to the second processing device.

19. The computer-implemented method of claim 16, further comprising performing, by the second processing device, the operation in response to determining that the second processing device has available resources to process the message.

20. The computer-implemented method of claim 16, wherein the operation is an RDMA read operation.

21. The computer-implemented method of claim 16, wherein the first processing device and the second processing device communicate with each other across a PCIe connection.

22. A processing node, comprising:
a message transport layer for establishing message communications with another processing node;
an RDMA-capable network interface for converting the message communications into electronic signals for transmission over a physical network media to the other processing device; and
an RDMA messaging interface module positioned between the message transport layer and the network interface, wherein the RDMA messaging interface integrates the message communications with RDMA-capable communications for output to the other processing node, and wherein the RDMA messaging interface module provides driver features to the message transport layer to appear as a corresponding driver to the message transport layer.

23. The processing node of claim 22, further comprising a network stack, the network stack including the message transport layer, the RDMA-capable network interface, and the RDMA messaging interface.

24. The processing node of claim 22, further comprising:
one or more applications; and
a socket interface that establishes a communication between the one or more applications and the message transport layer.

25. The processing node of claim 22, further comprising a device driver that communicates with a network interface, wherein the RDMA messaging interface module communicates with the device driver.

26. The processing node of claim 22, wherein the RDMA messaging interface outputs a notification to another processing device, the notification indicating the availability of additional receive buffers for the other processing device.

27. The processing node of claim 26, further comprising a plurality of message data buffers constructed and arranged to process data related to at least one of a data transmit operation and a data receive operation.

28. The processing node of claim 27, wherein the message data buffers include at least one of source buffers and receive buffers.

29. The processing node of claim 22, further comprising a buffer management module that manages an allocation of available buffers of the message data buffers.

30. The processing node of claim 22, further comprising a control queue that stores notification records related to the message communications.

31. The processing node of claim 22, further comprising one or more pre-posted receive buffers, each corresponding to a receive buffer of a destination processing node.

32. The processing node of claim 31, wherein the one or more pre-posted receive buffers is provided in response to a speculation that the processing node continues to send messages to the destination processing node.

33. A server aggregation system, comprising:
a source processing node, comprising:
a message transport layer for establishing message communications with a destination processing node;
an RDMA-capable network interface for converting the message communications into electronic signals for transmission over a physical network media to the destination processing device; and
an RDMA messaging interface module positioned between the message transport layer and the network interface, wherein the RDMA messaging interface integrates the message communications with RDMA-capable communications for output to the destination processing node, and wherein the RDMA messaging interface module provides driver features to the message transport layer to appear as a corresponding driver to the message transport layer;
the destination processing node, comprising:
a message transport layer for establishing message communications with the source processing node;
an RDMA-capable network interface for converting the message communications into electronic signals for transmission over a physical network media to the source processing device; and
an RDMA messaging interface module positioned between the message transport layer and the network interface, wherein the RDMA messaging interface integrates the message communications with RDMA-capable communications for output to the source processing node, and
wherein the RDMA messaging interface module provides driver features to the message transport layer to appear as a corresponding driver to the message transport layer; and
a network device that exchanges the message communications between the source processing node and the destination processing node.

34. The server aggregation system of claim 33, wherein the network device includes a switch fabric.

35. The server aggregation system of claim 33, wherein the network device includes a network interface.

36. The server aggregation system of claim 35, wherein the network interface is at least one of a virtual network interface card (vNIC) and a physical network interface card NIC.

37. The server aggregation system of claim 33, wherein the source processing node includes a plurality of source buffers and the destination processing node includes a plurality of receive buffers.

38. The server aggregation system of claim 37, wherein the source processing node further comprises one or more pre-posted receive buffers, each corresponding to a receive buffer at the destination processing node.

39. The server aggregation system of claim 38, wherein the one or more pre-posted receive buffers is provided in response to a speculation that the source processing node continues to send messages to the destination processing node.

40. The server aggregation system of claim 33, wherein each of the source and destination processing nodes includes a PCI connector for establishing a communication path with the network device.

41. A non-transitory computer program product, comprising:
a computer readable storage medium having computer readable program code embodied therewith, the computer readable program code comprising:
computer readable program code related to an RDMA messaging interface configured to generate one or more messages that is processed by a RDMA messaging interface of a destination processing device, wherein the RDMA messaging interface is positioned between an RDMA-capable network interface and a message transport layer, the RDMA messaging interface providing driver features to the message transport layer to appear as a corresponding driver to the message transport layer;
computer readable program code related to the RDMA messaging interface configured to output a notification to the destination processing device that a message of the one or more messages is available;
computer readable program code configured to determine that the second processing device has resources to accommodate the message; and
computer readable program code configured to perform at the second processing device a first operation in response to determining that the second processing device has the resources to accommodate the message.

\* \* \* \* \*